Dec. 17, 1957  D. L. WILKERSON  2,816,564
AUTOMATIC FLUID FLOW CONTROL SYSTEM
Filed April 22, 1955
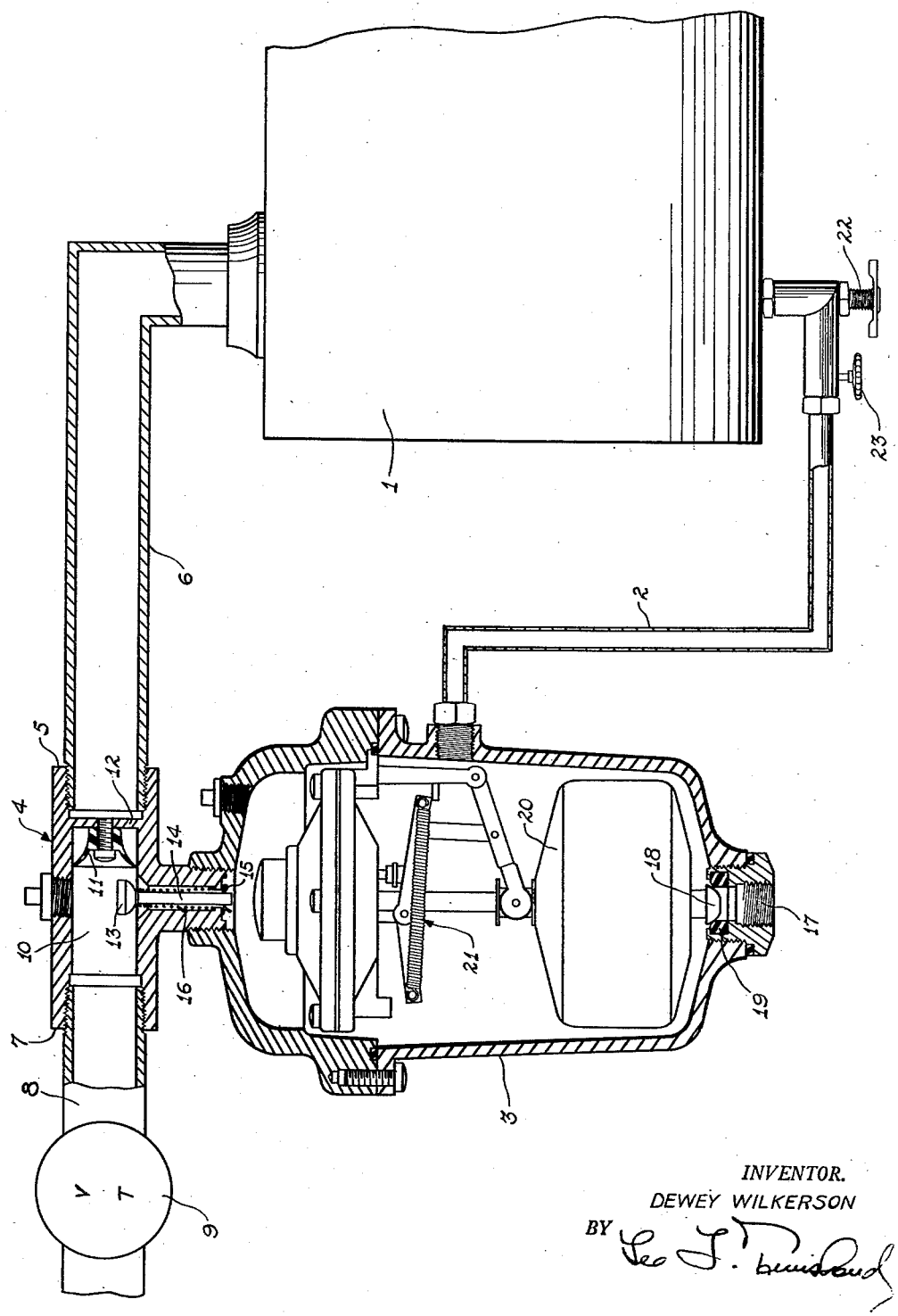
INVENTOR.
DEWEY WILKERSON
BY

United States Patent Office 2,816,564
Patented Dec. 17, 1957

2,816,564

AUTOMATIC FLUID FLOW CONTROL SYSTEM

Dewey L. Wilkerson, Denver, Colo., assignor to Wilkerson Corporation, Englewood, Colo., a corporation of Colorado Application April 22, 1955, Serial No. 503,093

2 Claims. (Cl. 137—110)

The present invention relates to the processing of compressed gaseous fluid stored in a reservoir or tank and deliverable on demand to one or more points of use in an intermittent application service line.

There are many situations in which it is highly desirable that fluid supplied from a reservoir to a service line under normal operating conditions be conditioned for various purposes such as, among others, the removal of moisture and other contaminants drained from a compressed air storage tank and entrained in air supplied from the tank to a service line, the filtering and/or other conditioning of compressed air or other gasses leaving the reservoir, and the addition of lubricant or other material thereto. Any such processing has, however, limits determined by the capacity of the particular processing apparatus, and often a condition in the service line occurs which temporarily requires a supply of the fluid in excess of the capacity of the processing apparatus to deliver, so that service operation may be seriously impaired.

The present invention provides a system and related apparatus for processing gaseous fluid delivered from a reservoir in which it is stored under pressure to an intermittent application service line; which includes self-contained means for automatically supplementing the supply of fluid to the service line with extra fluid direct from the reservoir in whatever volume required to satisfy a demand in the line for a supply in excess of the capacity of the processing means to deliver.

Another object is to provide in such a system means confining the fluid flow from the reservoir to a path through the processing apparatus during normal periods of operation in which there is no excess supply demand condition in the service line.

For purposes of statutory compliance, and without restriction thereto, a reduction to practice of the invention is herein shown and described as an application of its principles to a system and apparatus constituting an automatic drain for a compressed air storage tank.

Another object of the invention, having relation to the specific disclosure, is to provide a novel system and related apparatus for automatically draining a compressed air storage tank through the agency of air supplied from the tank to a point of use.

Other and incidental objects will be apparent from the following description taken in conjunction with the accompanying drawing, in which:

The single figure is a layout of the system and its related apparatus, with parts of the latter in section.

The embodiment of the invention as shown incorporates a receiver 1 for compressed air, conveniently a storage tank, from the bottom of which operational air passes through a conduit 2 to the interior of a drain valve casing 3 intermediate its top and bottom. The interior of the casing communicates through its top with a T-pipe fitting 4 the shank of which has a screw threaded detachable coupling into the top of the valve casing. One branch 5 of the fitting head connects with a second conduit 6 which leads from the top of the tank and the other branch 7 of the fitting head connects with a pipe line 8 leading to a point of use and controlled by a valve 9. The line consisting of the pipe 6, the fitting head bore 10 and the downstream pipe 8 has a uniform internal diameter greater than the internal diameter of the drain conduit 2, but air flow from the tank normally is confined to the conduit 2 by reason of a flow restrictor 11 in the fitting bore 10 between its point of communication with the pipe 6 and its point of communication through the shank bore with the interior of the valve casing 3.

The restrictor 11 is a funnel shaped valve made of oil resistant material similar to rubber mounted on a narrow bridge strip 12 extending across the bore 10. Its object is to restrict the flow of air sufficiently from the pipe 6 so that the air in conduit 2 will always flow up to its capacity any time air is drawn from the line 8 for any purpose.

An axial bore through the shank of the T-fitting 4 establishes communication between the interior of the valve casing and the fitting bore 10, and houses a safety valve having a head 13 adapted to seat upon and close the upper end of the shank bore when the valve casing is detached from the fitting. The valve head 13 has a depending stem 14 of smaller diameter than the diameter of the shank bore, which stem extends beyond the lower end of the fitting shank and carries a cotter pin or other stop means 15. A very light expansion spring 16 is coiled around the valve stem between the head 13 and an internal annular shoulder at the lower end of the shank bore and normally maintains the head raised from its seat with the stem stop 15 engaged against the lower end of the fitting shank. Reverse flow of air through the shank bore, as when the valve casing 3 is removed, acts on the head 13 to effect an immediate closing of the same on its seat, overcoming the bias of the spring 16 and preventing further escape of air from the line.

The valve casing 3 has a bottom discharge outlet 17 controlled by a drain valve 18 that normally is biased to closed position against a seat 19. A liquid level responsive float 20 that is slidable vertically on the stem of the drain valve actuates mechanism indicated generally at 21 for opening and closing the valve in response to movement of the float. The drain valve herein shown is of the type disclosed in my U. S. Patent 2,677,386 of May 4, 1954, and the valve details per se are not a part of the present invention except insofar as the valve, as a unit, enters into the general combination. Any suitable liquid level responsive valve may be used in the casing 3 to control the discharge orifice 17.

A manually operable drain valve 22 of a known type is provided at the bottom of the tank 1 in order that normal draining can be accomplished during service periods if necessary, and to meet the requirements of many state laws for a manual drain even though an automatic drain is used. The conduit 2 is itself controlled by a hand valve 23.

In normal operation, whenever air is drawn from the line at a point of use, there is unrestricted air flow from the tank 1 through conduit 2 and the interior of valve casing 3 past the open valve 13 into the fitting bore 10 and through line 8 to the point of use. The air expands upon entering the casing 3 and gives up the entrained moisture and foreign matter which it has carried from the bottom of the tank. This collects on the bottom of the casing until discharged under line pressure through the outlet 17 in response to movement of the float 20. The drain valve operates automatically whenever the float 20 is raised sufficiently to effect opening of the valve.

If at any time the demand for air from the line 8 exceeds the supply capacity of the conduit 2 the higher pressure existing in the pipe 6 opens the restrictor 11 so that the requisite additional air is supplied to the line from the top of the tank. When the excess demand ceases the restrictor resumes its normal position substantially blocking air flow through the pipe 6.

The valve casing can be removed from the system for servicing without interrupting air supply from the tank to the line 8, simply by closing the hand valve 23, uncoupling the conduit 2 from the valve casing, and detaching the valve casing from the shank of the fitting 4. As before stated, the valve 13 closes automatically upon removal of the valve casing. When the valve casing is again connected to the fitting and the conduit 2 is coupled to the casing normal air flow is restored by opening the valve 23, whereupon, because of the restrictor 11, all operational air not in excess of the capacity of the conduit 2 must be supplied through that conduit from the bottom of the tank. Even downstream leaks are constantly removing contaminants from the tank into the drain valve casing, so that the tank is kept 100% dry at all times. The presence of the restrictor in the line from the top of the tank effects a reduced pressure in the line beyond the point occupied by the restrictor.

In its broad aspects the tank 1 is a reservoir or receiver for gaseous fluid under pressure. The line 8 is a service line. The lines 2 and 6 are a plurality of fluid supply lines connecting the service line with the reservoir. The valve casing 3 and its drain constitute means in the supply line 2 for processing fluid passed therethrough. The restrictor 11 is a blocking means in the supply line 6 that is effective during normal operation to block fluid flow through that supply line to the service line; and whenever demand for fluid in the service line 8 calls for more fluid than the line 2 can supply the thin wall of the restrictor flexes under the pressure in line 6 and thereupon is no longer effective to block the line as the line is then open to supply the necessary additional fluid to the service line.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In a system including an intermittent application compressed air service line and a compressed air storage tank, an upper pipe line from an upper portion of the tank, a T-pipe fitting having one branch of its head connected to said upper pipe line and the other branch connected to the service line, an enclosed casing having a connection with the shank of said fitting, said shank having an air passage therethrough establishing communication between the casing interior and the service line, a lower pipe line from the bottom of the tank to said casing intermediate its top and bottom, said casing providing a trap for separating and collecting moisture and other contaminants entrained in air passing therethrough from the tank bottom, drain valve means in the casing operative in response to the level of liquid accumulated on the casing bottom to discharge the liquid and contaminants through the casing bottom, and means within the fitting preventing air flow from said upper pipe line to the service line except when air demand in the service line exceeds the capacity of the lower pipe line.

2. A system according to claim 1, the connection between said casing and the shank of said fitting being detachable for removal of the casing, and means in the fitting operative automatically upon removal of the casing to close the fitting shank air passage against escape of air from the fitting.

References Cited in the file of this patent

UNITED STATES PATENTS

| | | |
|---|---|---|
| 556,008 | Harris | Mar. 10, 1896 |
| 1,278,118 | De Marest | Sept. 10, 1918 |
| 2,192,769 | Dach | Mar. 5, 1940 |

FOREIGN PATENTS

| | | |
|---|---|---|
| 114,286 | Australia | Nov. 24, 1941 |